Oct. 4, 1960
F. C. MOBERLY ET AL
2,954,603
JACK AND ANCHOR THEREFOR
Filed Feb. 4, 1957
2 Sheets-Sheet 1
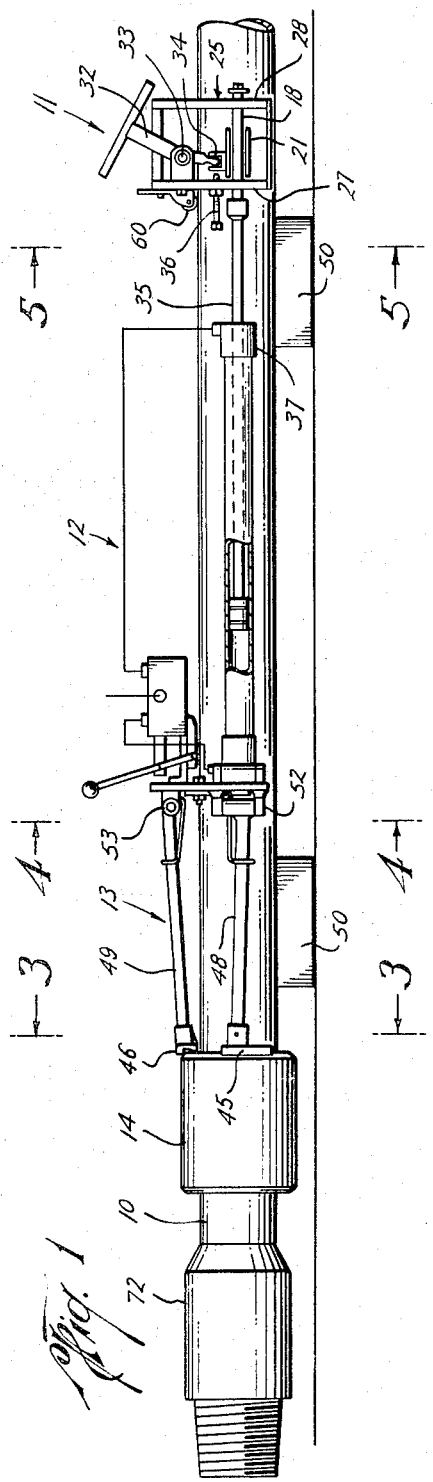
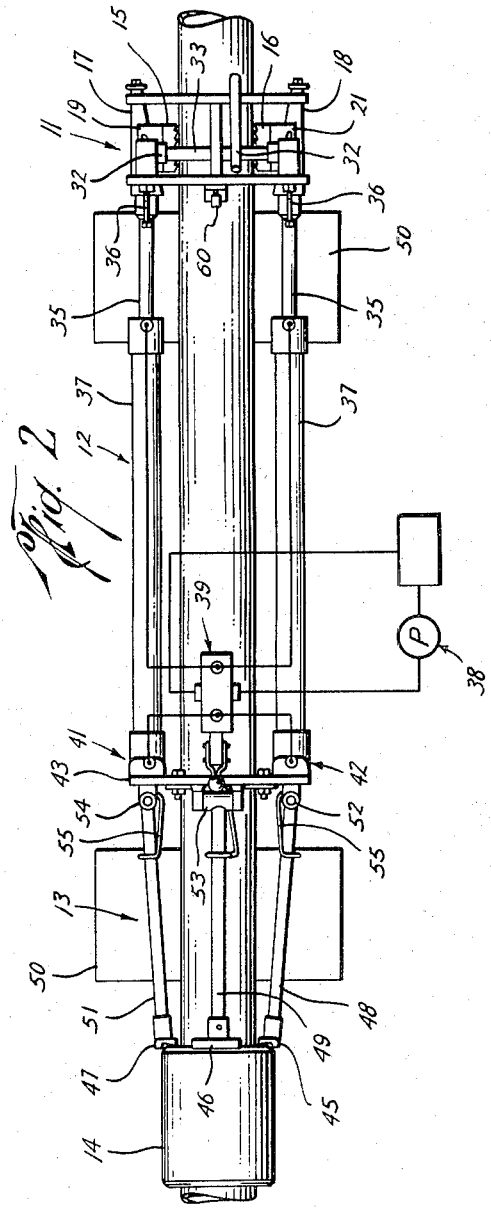
Floyd C. Moberly
Thomas M. Smith, Jr.
INVENTORS
BY
Browning, Simon & Hyer
ATTORNEYS

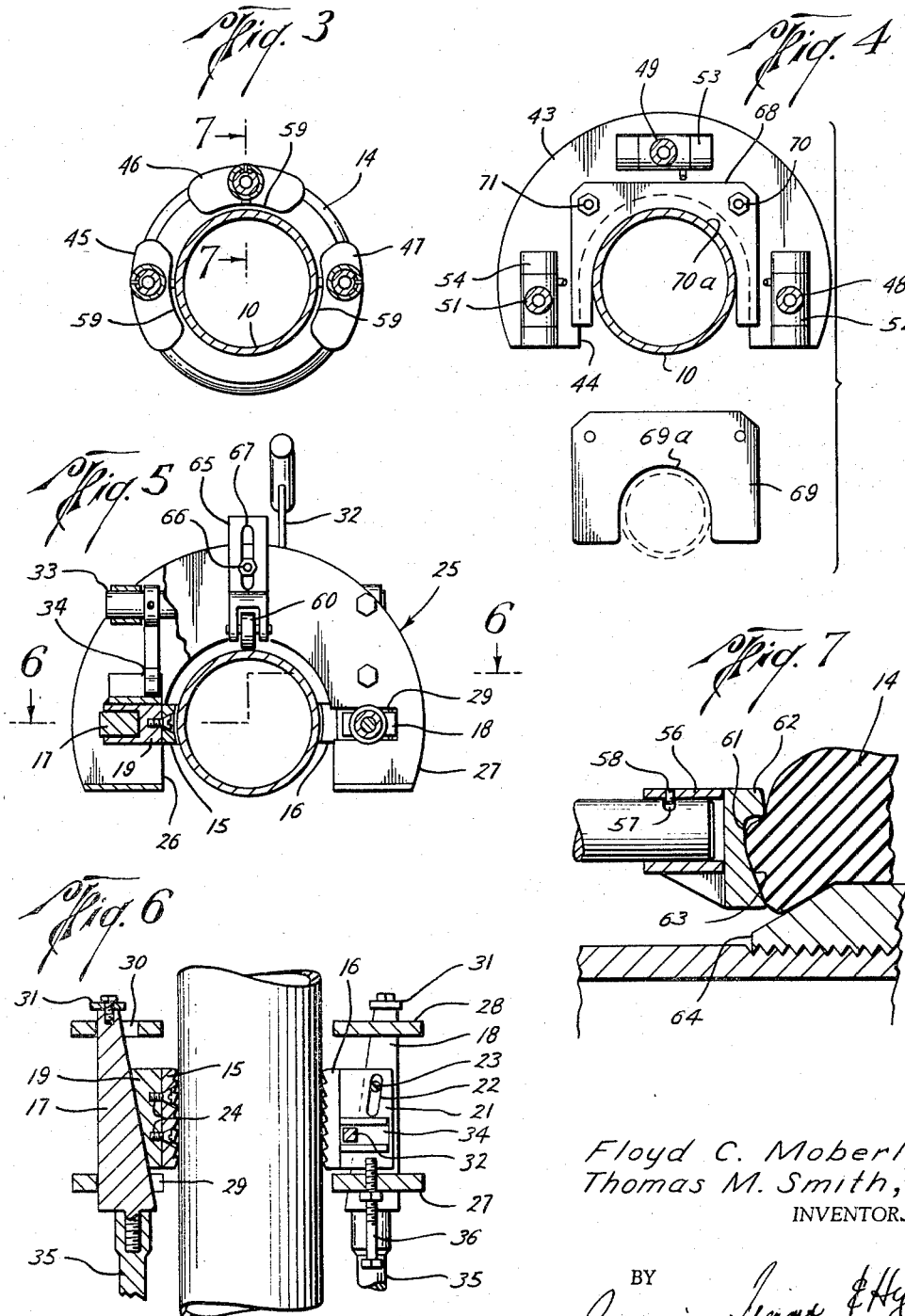

United States Patent Office 2,954,603
Patented Oct. 4, 1960

2,954,603

JACK AND ANCHOR THEREFOR

Floyd C. Moberly and Thomas M. Smith, Jr., both of 5805–07 Harvey Wilson Drive, Houston 20, Tex.

Filed Feb. 4, 1957, Ser. No. 637,976

3 Claims. (Cl. 29—236)

This invention relates to jacks or other tools for use with pipes. In one important aspect, it relates to jacks for stripping protectors from pipe. In another important aspect, it relates to anchors for securing jacks or other tools to pipe.

Drill pipe used in rotary drilling of petroleum wells is usually protected against abrasion by tight fitting, short tubular rubber members known as "protectors." These protectors are placed on pipe in a stretched condition to provide a firm grip on the pipe and are, therefore, difficult to remove.

It is frequently desirable to remove the protectors. As they are expensive, it is desirable to remove them with as little damage as possible.

The most common way in which this has been done in the past is to use a puller anchored in one end of pipe from which a protector is to be removed. Such a puller is shown in U.S. Letters Patent No. 2,694,853 issued to Miller on November 23, 1954. This type of puller normally requires two or three men in its operation and is slow and tedious to use.

By this invention we provide a simple, fast stripping machine which can be handled by one man. The machine of our invention pushes a protector from a pipe instead of pulling it as is done by Miller. The machine can be entirely unitized and there are no time consuming chains, hooks, etc., to position or assemble as in Miller.

A stripper jack for pushing protectors requires means for anchoring the machine to an intermediate section of the pipe. By this invention we provide an anchoring means eminently suitable for anchoring the stripping jack to the pipe. Obviously, the anchoring means can be used to anchor any desired tool to a pipe.

An object of this invention is to provide a simple, unitary stripping machine.

Another object is to provide a stripping machine which pushes a protector off of a pipe.

Another object is to provide a machine for pushing a protector off of a pipe which can be used with various size pipe.

Another object is to provide a stripping machine which has a very large area of contact with a protector being stripped to avoid damage to the protector.

Another object is to provide a stripping machine which will push a protector off a pipe of increasing size.

Another object is to provide a stripping machine which will push a protector off of a pipe having a square annular shoulder obstructing removal of the protector as, for instance, the shoulder on a removable tool joint.

Another object is to provide a pusher-type stripping machine which gives warning that the machine has hit an obstruction.

Another object is to provide a pusher-type stripping machine having several elements in contact with a protector in which movement of one element may be arrested without arresting movement of the other elements and warn the operator to stop operation of the machine.

Another object is to provide a machine for stripping a protector off a pipe in which the stripping shoes automatically engage a protector when the machine is placed on a pipe in operative position.

Another object is to provide a stripping machine capable of propelling itself along a pipe with a caterpillar-like action to push a protector part way off a pipe, move itself along to a new position, and push the protector completely off the pipe.

Another object is to provide abutment shoes for a stripping machine which move radially of the pipe with expansion and contraction of the protector being stripped.

Another object is to provide a machine for stripping protectors from pipe having an anchor for gripping a pipe intermediate its ends.

Another object is to provide an anchor for gripping pipe intermediate its ends.

Another object is to provide an anchor for gripping pipe intermediate its ends in which use of the tool carried by the anchor sets the anchor.

Another object is to provide an anchor for gripping pipe intermediate its ends in which the tool carried by the anchor can both set and release the anchor.

Another object is to provide an anchor for gripping pipe of various sizes.

Other objects, features and advantages of this invention will appear from the drawings, specification, and claims.

In the drawings wherein like reference numerals indicate like parts and wherein there is shown by way of illustration one embodiment of this invention:

Fig. 1 is a view in side elevation of a stripping machine constructed in accordance with this invention in a position to move a protector along a pipe;

Fig. 2 is a top plan view of the machine of Fig. 1;

Fig. 3 is a view along the lines 3—3 of Fig. 1;

Fig. 4 is a view along the lines 4—4 of Fig. 1 and additionally showing different size adapter plates used with the machine;

Fig. 5 is a view along the lines 5—5 of Fig. 1 with parts broken away and parts shown in section;

Fig. 6 is a view along the lines 6—6 of Fig. 5; and

Fig. 7 is a fragmentary sectional view on an enlarged scale through a pipe protector and one of the shoes of the illustrated machine showing how the shoe is moved radially of the pipe by the protector to permit it to pass over a square shoulder.

The stripping machine illustrated includes anchor means indicated generally at 11, jack means indicated generally at 12, and stripper means indicated generally at 13. The anchor means releasably secures the machine to a pipe 10 from which a protector 14 is to be stripped. The jack means 12 is extensible longitudinally of the pipe and is preferably provided with power means for extending and contracting the jack means. The stripper means 13 engages the protector 14 to push it off the pipe as the jack means 12 is extended.

The anchor means 11 is secured to the pipe by driving opposed toothed dogs 15 and 16 toward each other and into biting engagement with a pipe therebetween. This driving engagement may be provided in any desired manner as by the wedge bars 17 and 18 engaging complementary wedge surfaces on dog carriers 19 and 21, respectively.

It is desired to move the dogs away from each other to release the pipe and for this purpose each dog carrier is slotted as at 22 (Fig. 6) and one or more cam studs 23 projects from the wedge bar and extends into slot 22. The slot 22 extends parallel to the complementary wedge surfaces between the wedge bar and the carrier in which the slot is formed. Thus, upon relative movement between the wedge bars and carriers in one direction, the dogs will be forced toward each other and upon relative movement between the wedge bars and carriers in the opposite direction, the dogs will be moved away from each other.

It will be noted that the dogs are releasably secured to the carriers as by studs 24. This permits replacement of worn dogs without necessitating replacement of the carriers. It also permits use of various size dogs to position them closer to each other and grip smaller sizes of pipe.

In order to provide for securing the anchoring means to pipe over a wide range of sizes, it is also desirable to provide carriers 19 and 21 in a range of sizes. It is desired to vary the size of both the dogs and carriers to reduce the number of parts necessary to each machine.

It will be noted that the cam studs 23 are the only means holding the carriers in the anchoring means, and, therefore, the carriers may be quickly and easily interchanged.

The wedge bars 17 and 18 are slidably carried in framework 25 in the form of a yoke which has a central open ended slot-way 26 therein for receiving a pipe. The framework 25 includes a pair of horseshoe-like elements 27 and 28 held in rigid spaced relationship. The wedge bars 17 and 18 are slidably mounted in slots 29 and 30 in the frame members 27 and 28, respectively. A stop washer 31 is provided at the rear end of each wedge bar and exterior of the framework 25 to engage frame member 28 and limit relative movement of the wedge bar in a direction to retract the dogs 15 and 16.

Preferably, both manual and power means are provided for moving the wedge bars and carriers relative to each other to engage and release the dogs from a pipe.

The manual actuating means is provided by an arm 32 pivoted to the framework at 33. The arm 32 engages a slot 34 in each of carriers 19 and 21. Operation of the arm 32 causes relative movement between the carriers and wedge bars to move the dogs into and out of engagement with a pipe.

The setting of the dogs with the manual arm 32 will suffice to anchor the machine to a pipe against a small load. However, where the load is large, some portion of the load is preferably transmitted directly to the dogs to drive them into the pipe to a degree commensurate with the load on the tool and avoid any possibility of slippage of the anchor means. With the above considerations in view, it is preferred to secure the jack means 12 directly to the wedge bars 17 so that as the jack is extended the wedge bars 17 will be moved in a direction to drive the dogs toward each other.

When the dogs are set with considerable force, the sticking taper between the bars and carriers may exert a resistance which is difficult to overcome with the small mechanical advantage of the manual actuator arm 32. Therefore, it is preferred to provide a power means for releasing the anchor from a pipe when desired. A power release may be provided by engagement between the jack means and anchor frame 25 during the retracting stroke of the jack means. This abutment may conveniently be provided by securing the connecting rod or rods 35, as the case may be, to the wedge bars 17 and 18 and providing a stop member 36 engageable with the cylinder or cylinders 37 of the jack, as the case may be, during the retracting stroke of the jack. After abutment, continued retracting of the jack will move the wedge bars 17 and 18 in a direction to retract the dogs until the stop washers on the free end of the wedge bars engage the anchor framework and prevent further movement of the wedge bars relative to the framework.

The jack means 12 may include one or more jacks, preferably two, arranged to be extensible and contractible longitudinally of a pipe to which the anchor 11 is secured. Each of the two jacks illustrated are two-way hydraulic jacks operated by fluid from a source illustrated schematically at 38. Control of flow of fluid to and from each end of each jack is provided by a four-way valve indicated generally at 39.

The stripper means 13 is secured to the jacks 37 by parallel hinge connections indicated generally at 41 and 42. These hinge connections are between the carrier 43 of the stripper means and the several jacks. The four-way valve 39 is also secured to the carrier 43. The carrier 43 is a yoke provided with an open slot-way 44 to permit it to be received about a pipe. Its slot opens in the same direction as the slot in yoke 25 and is in alignment therewith.

Secured to the carrier are a plurality of shoes 45, 46, and 47. These shoes are adapted to engage a protector 14 and move it along a pipe. As the protector 14 must frequently be moved over pipe of increasing diameter and it is desirous to use the machine with pipe of different diameter, the shoes 45, 46, and 47 should be mounted for radial movement relative to the pipe. Preferably, the shoes are carried by fingers 48, 49, and 51 which project from the carrier 43 in the direction of movement of the carrier when the jack means is extended. Preferably, the finger 49 is secured to the carrier adjacent the closed end of slot 44. The other two fingers 48 and 51 are preferably secured to the carrier adjacent the open end of the slot 44 and on opposite sides of the finger 49.

Provision is made for movement of the shoes 45, 46, and 47 radially of a pipe by hinging the fingers 48, 49, and 51 to the carrier 43 with the hinge means 52, 53, and 54, respectively. The hinge means 52, 53, and 54 are secured to the carrier 43 for hinge movement about axes approximately tangent to a circle passing through the intersections of the three fingers with said axes.

Preferably, the hinge 53 provides for hinge movement which is tangent to such circle. However, as this hinge carries a finger 49 which is not opposed by a corresponding opposite hinge, there is a tendency for the machine to knuckle at the hinge 53 because the finger 49 is inclined inwardly toward the slot 44 when in use. To offset this tendency the two fingers 48 and 51 extend upwardly from their hinge points by an amount which will offset this knuckling tendency. The angle of upward inclination of the fingers 48 and 51 is approximately equal to one half the downward inclination of finger 49 when in use on the medium size pipe for which the machine is designed. The upward inclination of the fingers 48 and 51 must be sufficient to prevent knuckling of the machine with all sizes of pipe with which it is used. On the other hand, the upward inclination of these fingers should be no more than necessary as it increases frictional drag between the carrier 43 and pipe.

With the above considerations in view, it will be noted from Fig. 4 that the hinges 52 and 54 are both displaced slightly toward the open end of slot 44 from a diametral plane extending horizontally across the machine. They, therefore, have hinge axes which are slightly displaced from a tangent to a circle such as above described. It will further be noted from Fig. 1 that the free end of fingers 48 and 51 lie in a horizontal diametral plane of the pipe and as the hinge axes of hinges 52 and 54 are perpendicular to this diametral plane through the pipe, the shoes will move in and out along radii of the pipe.

The shoes should be urged inwardly toward a common center coincident with the center line of the pipe so that they will be in a position to engage protector 14 automatically when the machine is positioned on a pipe. For this purpose, the light springs 55 are provided, one for each finger to urge the fingers toward a common center.

Referring now to the shoes 45, 46, and 47, each shoe is provided with a rearwardly extending identical socket 56 (Fig. 7) for receiving the free end of one of the fingers. The fingers are slotted circumferentially as at 57 and locking pins 58 are threadedly received in socket 56 and extend into the circumferential slot 57 to hold the shoes on the fingers. These circumferential slots permit rotational movement of the shoes relative to the fingers and insure that the concave inner surface 59 of each shoe will lie snugly against the exterior of the pipe as the shoes are moved into engagement with the protector.

Each shoe forms more or less a segment of a circle and when in use with the smallest size pipe for which the machine is designed, the shoes will almost abut each other and will encompass approximately three-fourths of a circle. It is desired to have the shoes include as much of a circle as possible and yet all be on one side of a line tangent to the pipe and passing adjacent shoes 45 and 47 on their sides remote from shoe 46. This arrangement permits the machine to be used to strip protectors from a pipe resting upon blocks 50. In fact, the design of the entire machine is such that it will freely slide along the pipe above these blocks.

The curvature of the inner surface 59 of each shoe is preferably approximately the curvature of the largest portion of the largest pipe that is expected to be encountered. It has been found that this will insure maximum engagement of the several shoes with protectors of various size.

Referring now to the abutment faces of the shoes, it will be seen that they are each provided with an arcuate groove 61. This groove provides at the radial outer extremity of each shoe a flange 62 which overlies a portion of a protector when in use, as best illustrated in Fig. 7. As the protector expands radially in moving over an enlarged portion of the pipe it will engage this flange and move the shoes radially outwardly so that they will not engage the enlarged diameter portion of the pipe. The protectors are beveled at their end faces as best shown in Fig. 1 and the notch 61 is so provided that the flange 62 overlies the beveled portion of the protector to permit the beveled portion of the protector to fill notch 61 so that it will lift the shoes as the protector expands. The engagement face of the shoe slopes from notch 61 to the radially innermost portion of the shoe to provide a sloping wall 63 engageable with an end face of a protector to prevent the shoes from slipping over the protectors. It has been found that if the notches 61 are positioned too close to the pipe that there is a tendency for the shoes to engage the pipe in moving over an increasing diameter portion. The notches should be spaced so as to be just filled by the end beveled portion of the protector so that as this beveled portion of the protector begins to raise it will lift against the flange 62 to move the shoe away from the pipe. It has been found that this arrangement will permit the shoe to pass over a square shoulder such as shoulder 64.

In the event one of the shoes does strike an obstruction such as shoulder 64, the construction of the machine is such as to permit this particular shoe to stop while the other shoes continue to move forward a short distance. In doing so the operator will be warned that something is wrong and can stop the machine before something breaks. For instance, when shoe 46 strikes an obstruction, the hinge 53 will cause the machine to knuckle and raise from the pipe. If either of shoes 45 or 47 strikes an obstruction, the hinges between the side fingers 48 and 51 and the carrier 43 cooperate with the hinges 41 and 42 which secure the carrier to the jack means to permit the carrier 43 to hinge relative to the jack means and cock sideways, that side of the carrier to which the obstructed shoe is connected stopping while the other side of the carrier, with its unobstructed finger and shoe, continuing to move. Insofar as the jack is concerned, this action is made possible by providing a common outlet from the four-way valve to the two cylinders 37, allowing one jack to be stopped while the other continues movement without damage. As the carrier plate 43 cocks, the operator is warned that something is wrong, and, within the small limits of the cocking action, will have time to stop operation of the machine. It will be appreciated that to function in this manner the hinges between the carrier 43 and the jack means as well as between the two side fingers 48 and 51 should all provide for hinge movement about substantially parallel axes.

When using the machine with different diameter pipe, it is desirable to position the machine about each pipe with the machine in a common position relative to the central axis of each of the pipes. For this purpose, the anchor means is provided with an antifriction means such as roller 60 to support the anchor means on a pipe. The roller is positioned intermediate the two opposed dogs in the illustrative form of the invention and the roller and dogs cooperate to center the machine about a given pipe. With changes in diameter of pipe, the roller is raised and lowered relative to frame 25. Provision may be made for raising and lowering in any desired manner such as by the slotted carrier 65 for the roller which is secured to the framework 25 by a stud 66 extending through the slot 67 in the slotted carrier 65.

At the stripper end of the machine the carrier 43 is provided with a plurality of adapter plates 68 and 69 which are secured to the carrier by spaced studs 70 and 71, it being understood that a suitable slotted adapter plate will be provided for each size of pipe with which the machine is to be used. The adapter plates are slotted as at 70a and 69a to provide a slot which will just receive the pipe with which it is to be used. As drill pipe is of a common diameter down to the tool joint 72, the adapters will be sized for the normal diameter of the pipe.

It will be noted that the adapters have a sliding fit with the pipe while the anchor means has a rolling support on the pipe. Thus, when the anchor is released, operation of the jack will draw the anchor means along the pipe. Then when the anchor is operated to secure it to the pipe, operation of the jack will move the stripper means along the pipe.

It is believed that the operation of the machine is apparent from the above. The entire machine assembled as shown is straddled over a pipe supported on wood spacers 50. The machine is slid along the pipe until the shoes abut against the protector 14. The manual operating handle 32 is actuated to drive the dogs of the anchor in against the pipe. The four-way valve is then operated to extend the jack means. As resistance to movement is offered by the protector 14, the jack means first drives the dogs into firm engagement with the pipe. Then continued operation of the jack means causes protector 14 to move along the pipe. If the protector is spaced a sufficient distance from the end of the pipe to prevent it being moved in one operation, the user operates the handle 32 to release the anchor means 11 and reverse the direction of four-way valve 49 to contract the jack means and move the anchor means along the pipe toward the stripper means. As soon as the jack means is contracted, the manual handle 32 is again operated to secure the anchor to the pipe and the cycle repeated. In the event the operator finds it difficult to release the anchor 11, he can contract the jack means until the cylinders of the jack means strike stops 36 and use the power of the jacks to release the dogs from the pipe.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown The invention having been described, what is claimed is:

1. A machine for stripping a protector from a pipe comprising first and second spaced apart yokes disposed in approximate parallelism to and axial alignment with each other and having slot-ways therein respectively with open ends facing in the same lateral direction and of a size to receive a pipe from which a protector is to be removed, jack means interconnecting said yokes on opposite sides of their respective slot-ways and operable to move said yokes toward and away from each other, one-way anchor means on said first yoke engageable with a pipe disposed within the slot-ways of said yokes to anchor said first yoke against movement along the pipe in one direction and releasable from such pipe to permit movement of the first yoke along the pipe in the other direction, means interconnecting said jack means and anchor means for moving said anchor means into such anchoring engagement with a pipe upon initial actuation of said jack means in a direction tending to move said first yoke in said one direction and for releasing such anchor means upon initial actuation of said jack means in said other direction, and a plurality of shoes mounted on said second yoke for floating movement toward and away from a pipe disposed within said slot-ways and having protector engaging faces disposed toward said other direction to engage and move a protector along a pipe in said slot-ways upon actuation of said jack means in a direction tending to move said first yoke in said one direction and said second yoke in said other direction.

2. A machine for stripping a protector from a pipe as defined in claim 1 in which said yokes have parts exclusive of said anchor means and of different frictional characteristics disposed to engage a pipe in said slot-ways, such part on the second yoke having higher frictional characteristics than the part on the first yoke, whereby, with said anchor means released said first yoke will move along a pipe in said slot-ways more freely than said second yoke.

3. A machine for stripping a protector from a pipe comprising first and second spaced apart yokes disposed in approximate parallelism to and axial alignment with each other and having slot-ways therein respectively with open ends facing in the same lateral direction and of a size to receive a pipe from which a protector is to be removed, means for anchoring said first yoke to a pipe disposed in said slot-ways to hold it against movement in one directon therealong, jack means interconnecting said yokes on opposite sides of their respective slot-ways and operable to move said second yoke with respect to the first in the other direction along such pipe when the first yoke is anchored to the pipe, and a plurality of shoes mounted on said second yoke for floating movement toward and away from a pipe disposed within said slot-ways and having protector engaging faces disposed toward said other direction to engage and move a protector along a pipe in said slot-ways upon actuation of said jack means to move said second yoke in said other direction, the connections of said jack means to said second yoke being flexible to permit limited tilting of said second yoke with respect to said jack means in the event of positive stoppage of movement of one of said shoes during actuation of said jack means.

References Cited in the file of this patent

UNITED STATES PATENTS

| | | |
|---|---|---|
| 409,008 | Breymann | Aug. 13, 1889 |
| 436,915 | Fischer | Sept. 23, 1890 |
| 889,315 | Kenyon | June 2, 1908 |
| 1,249,947 | Gilbert | Dec. 11, 1917 |
| 2,000,503 | White | May 7, 1935 |
| 2,187,878 | Hill et al. | Jan. 23, 1940 |
| 2,229,364 | Blackman | Jan. 21, 1941 |
| 2,263,638 | Minor | Nov. 25, 1941 |
| 2,291,251 | Norris | July 28, 1942 |
| 2,344,939 | Bennett | Mar. 28, 1944 |
| 2,429,341 | Ballagh | Oct. 21, 1947 |
| 2,669,773 | Price | Feb. 23, 1954 |
| 2,719,695 | McKee | Oct. 4, 1955 |
| 2,830,551 | Miller | Apr. 15, 1958 |

FOREIGN PATENTS

| | | |
|---|---|---|
| 85,676 | Sweden | Feb. 25, 1936 |
| 991,965 | France | June 27, 1951 |